March 13, 1956  R. B. MATTHEWS  2,738,450
ELECTROMAGNETIC CONTROL DEVICE
Filed April 22, 1952  2 Sheets-Sheet 1
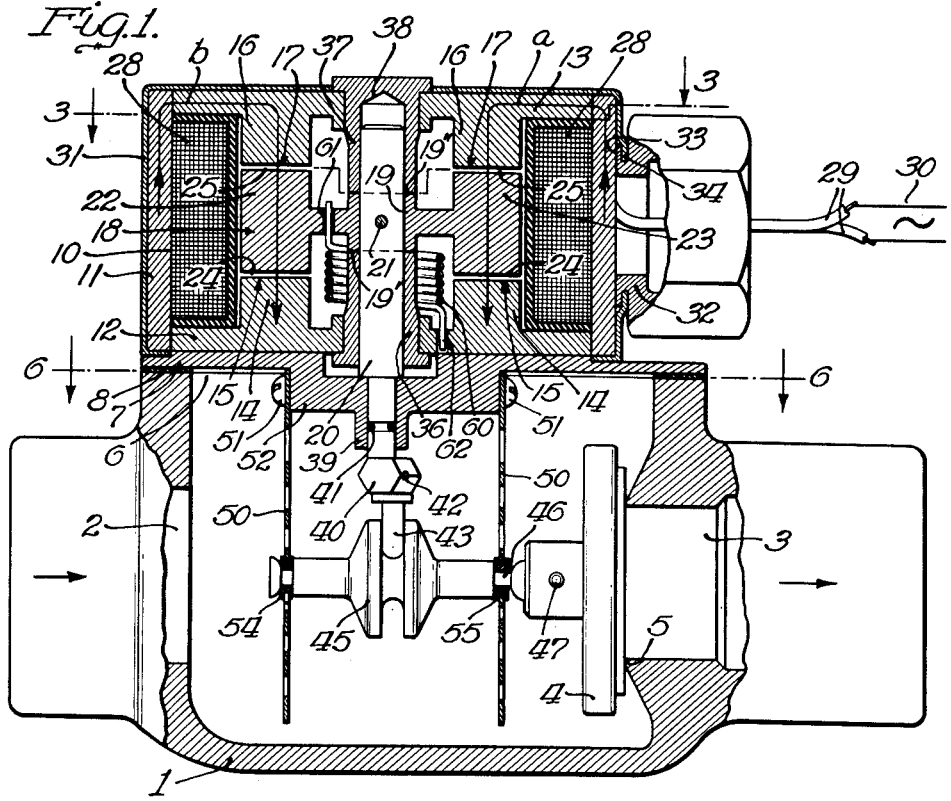
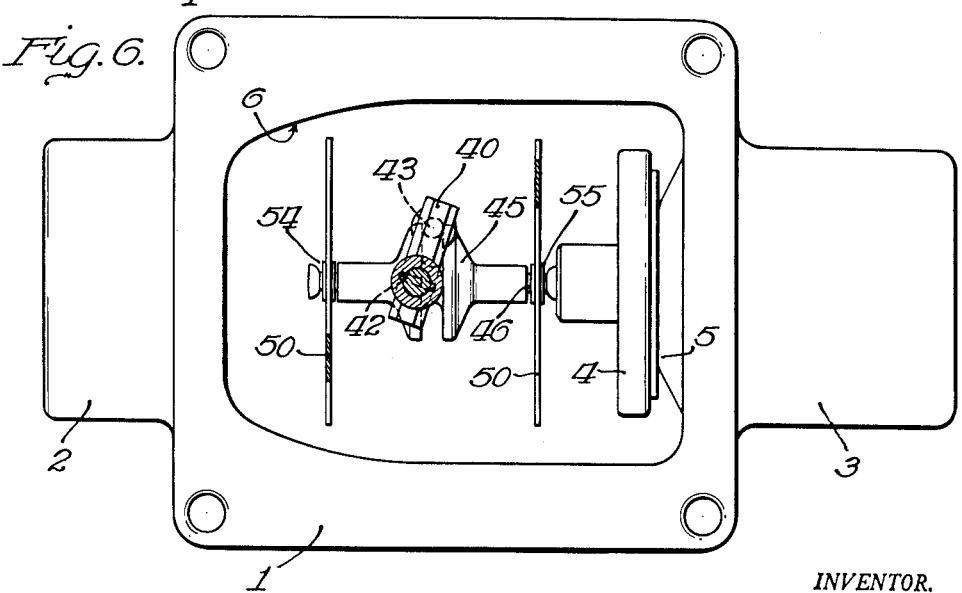
INVENTOR.
Russell B. Matthews
BY
Attys.

March 13, 1956 R. B. MATTHEWS 2,738,450
ELECTROMAGNETIC CONTROL DEVICE
Filed April 22, 1952 2 Sheets-Sheet 2
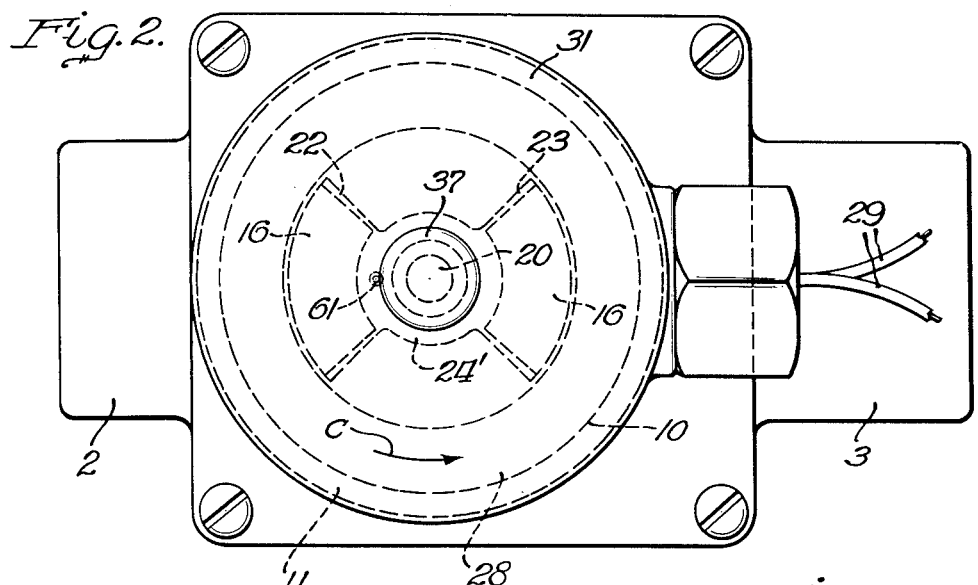
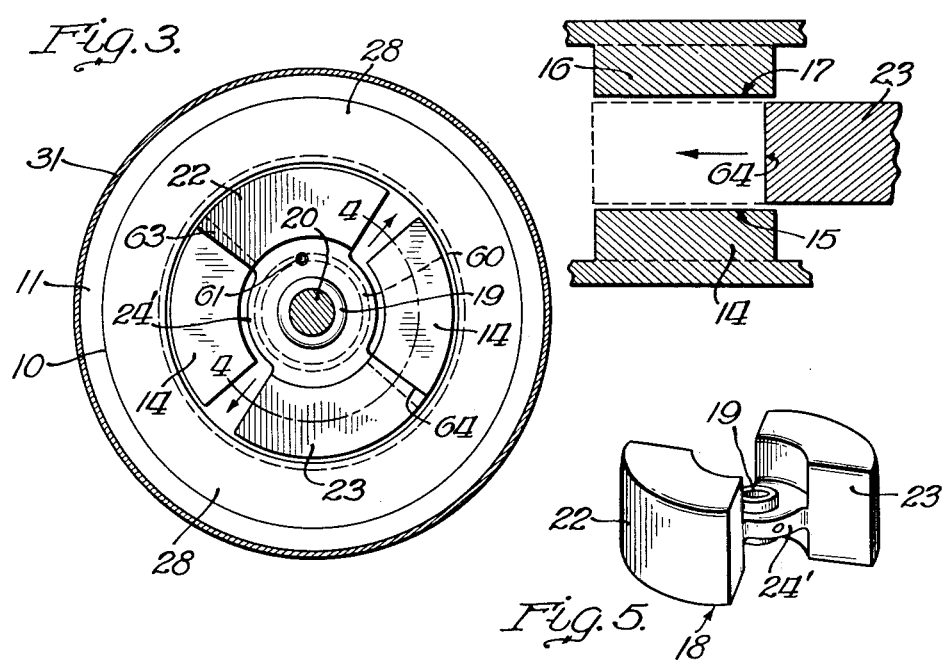
INVENTOR.
Russell B. Matthews
BY
Attys.

United States Patent Office 2,738,450
Patented Mar. 13, 1956

2,738,450

ELECTROMAGNETIC CONTROL DEVICE

Russell B. Matthews, Wauwatosa, Wis., assignor to Milwaukee Gas Specialty Company, Milwaukee, Wis., a corporation of Wisconsin Application April 22, 1952, Serial No. 283,551

11 Claims. (Cl. 317—197)

This invention relates, in general, to control devices, and more particularly to electromagnetic operators having particular utility in the operation of valves or the like of novel construction and coaction for controlling the flow of fluids therethrough.

While I have shown and shall describe herein the electromagnetic operator of the present invention as applied for operating a valve, it is to be understood that it is not in its broader aspects limited to such use but may be employed for all similar purposes, for example, for operating a switch or the like or other desired device.

One of the main objects of the present invention is to provide an improved form of device wherein loss of power generated by the magnetic field in axial thrust on the bearings is eliminated.

Another object is to provide a device in which the working air gap is divided into equal parts on opposite sides of the magnetic rotor in the direction of the axis thereof whereby the inherent tendency of the electromagnet to reduce either air gap will be opposed by the inherent tendency opposing any increase in the other air gap for accomplishing the results set forth.

Another object is to provide an improved form of control device wherein the initial operating force which is obtained is at a maximum at the beginning of the operator movement, as distinguished from devices in which the force exerted initially is a minimum. This is advantageous in that it provides a large initial or starting force for overcoming the inertia and friction of the moving parts and a strong initial force which, for example, will overcome fluid pressures, for example, in "cracking" or opening a valve wherein the controlled fluid, such as gas for a gas heater, usually tends to hold the valve closed.

Another object is to provide an improved form of electromagnetic operator wherein the magnetic air gap is never completely closed, and which air gap remains constant throughout the life of the device, as distinguished from electromagnetic devices wherein a magnetic part is attracted to and sealed against an electromagnet when energized or in which non-magnetic spacers are utilized in an attempt to maintain an air gap. The present device thereby eliminates any sticking or "hang up" of the attracted member and substantially eliminates any differential in the "pick up" and "drop out" of the device as, for example, due to residual magnetism. The present invention thereby provides an electromagnetic operator of greater sensitivity and quicker response.

Another object is to provide an improved electromagnetic operating means for translation of electric energy to rotary mechanical movement, and more particularly to rotary movement controlled both in direction and magnitude and wherein a magnetic stop is provided to prevent rotation of greater degree than that desired.

Another object is to provide an improved form of device of the aforementioned character wherein the movable parts are afforded magnetic stops and which is immune to the influence of gravity and may therefore be used in any position.

Another object is to provide a device of the character set forth which is quiet and efficient in operation and which affords increased efficiency in the transformation from electrical to mechanical energy, for example, in providing for a given size unit substantially increased output as compared to known devices of similar character.

Another object is to provide in a device of the character set forth a magnetic frame affording an air gap and a magnetic rotor which may be movable into the air gap when energized and out of the air gap when deenergized by biasing means matched to the electromagnetic energizing means to complement the inherent characteristics of the latter in affording maximum rotor torque at the start of rotation when it is most desired.

Another object is to provide an improved form of device of the character set forth in which, when utilized as a valve operator, the operator biasing means may also serve as a support for the movable valve parts, and further in which the valve may be rendered normally open or normally closed by mere reversal of the combination biasing-supporting means.

Another object is to provide a small, compact and highly efficient operator that lends itself to economical fabrication, is silent in operation, has high torque at the start of the stroke, and has no need for shading, and in which the rotor and magnetic frame fabrication are simplified.

Another object is to provide a device of the character described which may utilize a non-laminated magnetic frame thereby reducing cost and simplifying construction.

Another object is to provide an improved device which provides armature portions of increased area and at the same time enables reduction in the mass and inertia of the rotor; also a device which does not require core pieces between armature portions of the armature or rotor.

Further objects and advantages and numerous adaptations of the invention will appear from the following detailed description taken in connection with the accompanying drawings showing one embodiment of the invention, it being understood that the invention is limited only within the scope of the appended claims and not to the particular embodiment selected for illustration.

In the drawings:

Figure 1 is an axial sectional view of one form of device embodying the present invention;

Figure 2 is a plan of the device shown in Figure 1;

Figure 3 is a sectional view taken on the line 3—3 of Figure 1;

Figure 4 is a fragmentary sectional view taken on the line 4—4 of Figure 3;

Figure 5 is a perspective view of the magnetic rotor employed in the device selected for illustration; and Figure 6 is a sectional view taken on the line 6—6 of Figure 1.

Referring now to the drawings, the embodiment of the invention therein illustrated comprises a valve body 1 having a fluid inlet 2 and a fluid outlet 3. A valve member 4 cooperates with a valve seat 5 at the outlet 3 to control the flow of fluid through the valve, for example, the flow of gaseous fuel to a burner (not shown) or any other fluid. It will be noted that the controlled fluid tends to hold the valve member 4 closed. This may, of course, vary within the scope of the present invention.

The valve body 1 has an opening 6 covered by a closure plate 7 which may be secured in place, for example, by screws (not shown) threaded into the valve body 1. Sealing means 8 is preferably interposed between the plate 7 and valve body 1 to render the connection gastight. The closure plate 7 is preferably a die casting of non-magnetic material such as aluminum.

Mounted on the upper or outer side of the plate 7 is an electromagnetic operator which is designated in general at 10 and comprises a magnetic outer shell or frame 11 shown of annular form. A first magnetic frame member 12 is mounted on the plate 7 within one end of the shell 11 and with its outer periphery in good magnetic contact with the inner periphery of the inner end of the shell 11. A second magnetic frame member 13 is mounted within the opposite end of the shell 11 in axially spaced relation with respect to the magnetic frame member 12 and with its outer periphery in good contact with the inner periphery of the outer end of the shell 11. The magnetic shell 11 and magnetic frame members 12 and 13 with their pole pieces to be presently described are preferably non-laminated as, for example, in the form of castings which reduces the cost and simplifies construction.

The inner magnetic frame member 12 has a pair of arcuate pole pieces 14 formed, for example, as integral parts of the frame member 12. These pole pieces 14 project outwardly from the frame member 12 and have outwardly presented arcuate pole surfaces 15. The outer magnetic frame member 13 has a pair of similar arcuate pole pieces 16 formed, for example, as integral parts of the frame member 13. These pole pieces 16 project inwardly from the frame member 13 and have inwardly presented arcuate surfaces 17 presented toward and in register with the arcuate pole surfaces 15 but spaced therefrom in the direction of the axis of the device.

A rotary armature or rotor 18 has its hub 19 fixed, for example, to a shaft 20 at 21 so that the shaft 20 will turn with turning movement of the rotor as will presently appear. In general, the rotor 18 is of H-shape in vertical section as shown in Figures 1 and 5 and comprises a pair of arcuately shaped arms 22 and 23 joined by a connecting portion 24' midway between the ends of the arms. The connecting portion has the hub 19 formed, for example, as an integral part thereof. The rotor 18 is formed of magnetic material such as steel preferably fabricated by powder metallurgy technique.

As shown in Figure 1, the arcuate arms 22 and 23 operate between the opposing arcuate surfaces 15 and 17 of the pole pieces 14 and 16. The arcuate surfaces at opposite ends of the arms 22 and 23 are spaced endwise and preferably equally from the surfaces 15 and 17 sufficient distances at 24 and 25 (Figure 1) to afford clearance for the arms 22 and 23 through 360° of rotation. The configuration of the pole pieces 14 and 16 and the related configuration of the arms 22 and 23 are best shown in Figure 3. The air gaps 24 and 25 are relatively small. They need be no greater than the clearance needed for turning movement of the arms 22 and 23 between the pole pieces 14 and 16.

The electromagnetic operator 10 further comprises a solenoid coil 28 which is adapted to be connected to a suitable source of electric energy, for example, by conductors 29 to a source of alternating current indicated symbolically at 30. A cover 31 of non-magnetic material covers the outside and outer ends of the magnetic shell 11; also the outer surface of the magnetic frame member 13. The cover 31 may be suitably insulated with lacquer, anodizing or other means if desired. The conductors 29 lead to and from the coil 28, for example, through a conduit connection 32 which has a flange 33 disposed in an opening in the cover 31 and held in place, for example, by an interlocking flange 34 formed as an integral part of the cover 31. The coil 28 is shown of annular form and is disposed within the magnetic shell 11 around the rotor 18 and pole pieces 14 and 16 and endwise between the magnetic frame members 12 and 13.

The shaft 20 which is connected to turn with the rotor 18 is journaled for turning movement in inner and outer bearing sleeves 36 and 37 on opposite sides of the connecting portion 24' of the rotor. The hub 19 bears at 19' on the outer end of the inner sleeve 36 and the inner end of the outer sleeve 37 cooperates with the opposite side of the hub 19 at 19", sufficient clearance being provided to allow free turning of the rotor. The sleeve 36 is fixed in an opening in the magnetic frame member 12 and the sleeve 37 is fixed in an opening in the magnetic frame member 13. The outer end of the sleeve 37 is closed at 38. The shaft 20 extends downwardly through a sleeve 39 formed, for example, as a unitary part of the plate 7, the lower or inner end of the shaft 20 being connected non-rotatably but adjustably to one end of a crank member 40. A resilient or rubber-like O-shaped ring 41 is mounted in an annular groove near the inner or lower end of the shaft 20 and within the sleeve 39 to provide a gastight seal therebetween.

As best shown in Figure 6, the crank member 40 may be non-rotatably connected to the shaft 20 as by a pin 42 for transmission of any movement of rotor 18 to crank member 40. At the opposite end of the crank 40 is a downwardly extending pin 43 off center with respect to the axis of rotation of shaft 20. The pin 43 is adapted to engage a yoke 45 (Figure 1) connected at one end as by a stem 46 and pin 47 to valve member 4.

The aforementioned yoke-valve member assembly is preferably of the form illustrated and described in the copending application of Floyd J. Bydalek and Russell B. Matthews, Serial No. 270,666, filed February 8, 1952. The details of this assembly may be ascertained more fully by reference to the above mentioned copending application. Suffice it for purposes of the present application to state that the yoke-valve member assembly is preferably suspended in the valve body 1 as by a pair of springs 50 attached as by screws 51 to the integral portion 52 of the plate 7 which integral portion 52 extends inwardly through the opening 6 of the valve body. The springs 50 serve to support the valve member assembly in alignment with the valve seat 5 and may, if desired, serve also to bias both the rotor 18 and valve member 4 as will presently appear. When the plate 7 carrying the power unit or electromagnetic operator 10 is removed and/or replaced, the valve member assembly is removed therewith as a unit.

As shown in the aforementioned copending application, the springs 50 are preferably of flat spiral configuration in plan and conical helically in side elevation when uncompressed but numerous other configurations are contemplated. That is to say, when the turns are in a plane as shown in Figure 1, they are under compression and impart, for example, a sealing force to valve member 4 against its valve seat 5. Movement of the valve member 4 to open position against the bias of springs 50 further compresses the latter. In this regard, while as above mentioned the ends of the outermost turns of the springs 50 are attached to plate 7 as herein described, the innermost turn of each spring is attached to the yoke assembly as at 54 and 55.

The valve member 4 may be, in general, of the type more fully disclosed in the copending application of Carl Wolff, Serial No. 194,505, filed November 7, 1950, now Patent No. 2,687,501, but may, of course, be of other suitable form.

A torsion spring 60 is shown coiled about the sleeve 36 with one end fixed at 61 to the connecting portion 24 of the rotor 18. The opposite end of the spring 60 is fixed, for example, at 62 to the magnetic member 12. The spring 60 serves in the illustrated embodiment of the invention to bias the valve member 4 to closed position and the rotor 18 to the position as will presently be described or it may act conjointly with the springs 50 to provide these results.

The operation of the illustrated embodiment of the invention is as follows:

The rotor 18 is angularly disposed so that in unenergized condition the leading edges 63 and 64 (Figures 3 and 4) of the armature arms 22 and 23 are barely within the air gaps between the opposing arcuate surfaces 15 and 17 of the pole pieces 14 and 16; that is, a very small portion of the rotor 18 is presented to the pole pieces 14 and 16, respectively. The valve member 4 may be in closed position at this time as shown but it is to be understood that the valve may, of course, be normally open and operated to closed position by the magnetic operator. It is to be further understood that as previously set forth the electromagnetic operator may be used to operate an electric switch or any other similar or desired device.

It is, of course, understood that the angular position of the shaft 20 and hence rotor 18 and the position of the valve member 4 when the electromagnetic operator 10 is unenergized is determined, for example, by the bias of the springs 50 and 60 but may be determined by the bias of springs such as springs 50 or by the bias of a spring such as spring 60 alone. In the illustrated embodiment of the invention, the sealing of the valve member 4 against the valve seat 5 under the spring bias limits the rotation or turning movement of the rotor 18 and provides a stop therefor in its unenergized state.

When the circuit of the coil or winding 28 is closed, the coil generates magnetic flux in the magnetic structure which at one-half of the alternating current cycle flows in the direction indicated by the arrows $a$ and $b$ in Figure 1. This magnetic flux flows through the pole pieces 16 across air gaps 25 to link magnetic rotor 18; through the rotor 18; across air gaps 24; through pole pieces 14; and thence through the outside magnetic shell 11 to complete the magnetic circuit.

Since the magnetic flux will cross the air gaps betwen the pole pieces 16 and 14 at the point of minimum air gap, and since the minimum air gap occurs at the points where the leading edges 63 and 64 (Figures 3 and 4) are presented to the pole pieces 16 and 14, the magnetic flux will be concentrated at these points imparting a counter-clockwise torque to turn the rotor 18 in the direction indicated by the arrow $c$ in Figure 2. Hence, the rotor 18 will be rotated into the air gap until the arcuate surfaces of the rotor arms 22 and 23 are in registry with the pole faces 15 and 17 of the pole pieces 14 and 16, respectively, as shown in dotted lines in Figure 4. Further rotation of the rotor 18 will not occur since such movement would tend to increase the air gap and movement of the leading edges of the arms 22 and 23 beyond the pole faces of the pole pieces 14 and 16 would set up magnetic forces creating a torque in the opposite direction. The rotor 18 is thereby afforded a magnetic stop limiting its rotation in counterclockwise direction as viewed in Figure 2 to a position wherein the arms 22 and 23 are in registry with the pole faces of the pole pieces 14 and 16.

The foregoing phenomenon may be further elucidated by reference to the mathematical relationships involved which may be expressed as follows:

$$F = \frac{B^2 A}{72} \text{ lbs.}$$

where F is the force of attraction brought to bear upon the rotor 18 expressed in pounds. B is the magnetic flux density, and A is the area of rotor 18 presented to the pole pieces 14 and 16. From this relationship it will also be seen that the device described inherently imparts a greater force at the beginning of the stroke than at the end thereof, since A (the area of the rotor presented to the pole pieces) increases as the rotor approaches registry with the pole pieces and F varies inversely with A. For example, if the rotor area presented to the pole pieces is .0508 square inch when the rotor is unenergized and the total area of the rotor arms which may be presented to the pole pieces when in registry therewith is .71 square inch, the force at the beginning of the stroke will be 13.95 times the force exerted at the end of the stroke. This relationship has obvious advantages in that the rotor torque varies in the same manner as the forces required to operate a mechanism requiring greater force to initiate movement thereof than to maintain such movement, as for example, a valve member such as valve member 4 which must be moved against fluid pressure initially.

As best shown in Figure 1, the opposing pole faces of the pole pieces 14 and 16 are according to the present invention spaced in a direction parallel with the axis of the shaft 20 and are disposed on opposite sides of the rotor arms 22 and 23, that is, with the pole piece 14 below the rotor arms 22 and 23 and pole piece 16 above the rotor arms in the illustrated embodiment of the invention. This is highly advantageous in that it eliminates loss of power generated by the magnetic field in axial thrust on the bearings. By dividing the working air gap into equal parts on opposite sides of the magnetic rotor in the direction of the axis thereof, the inherent tendency of the electromagnet to reduce either air gap 24 or 25 will be opposed by the inherent tendency opposing any increase of the other air gap. Hence the magnetic forces tending to close the air gaps 24 and 25 oppose each other and frictional loss due to bearing thrust is eliminated. This is an important aspect of the present invention per se and in combination with the other advantageous aspects shown and described.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

I claim:

1. A magnetic armature of generally H-shape in axial section and mounted for turning movement about an axis, said armature having arcuate armature arms having flat pole faces presented endwise in opposite directions at the opposite ends of said arms and a web connecting said arms intermediate the ends thereof.

2. An electromagnetic operator comprising, a magnetically permeable frame having spaced opposing pole pieces defining an air gap therebetween, a magnetic armature mounted for rotation about an axis disposed generally parallel with the direction of spacing of said pole pieces from a retracted position wherein only a portion thereof is presented to said pole pieces to an attracted position in said air gap wherein said opposing pole pieces are spaced on axially opposite sides of said armature, and means for producing magnetic flux flow in said air gap from one of said opposing pole pieces to the other completely across the path of movement of said armature and substantially axially through said armature portion presented to said pole pieces, whereby to rotate said armature to said attracted position.

3. An electromagnetic operator comprising, a magnetically permeable frame having spaced opposing pole pieces defining an air gap therebetween, a magnetic armature mounted for rotation about an axis disposed generally parallel with the direction of spacing of said pole pieces, said armature having a peripheral portion whose axial dimension is slightly less than said pole piece spacing, and said armature being rotatable from a retracted position wherein said peripheral portion is only partially presented to said pole pieces to an attracted position wherein said peripheral portion is disposed in said air gap with said opposing pole pieces spaced on axially opposite sides thereof, and means for producing magnetic flux from one of said opposing pole pieces to the other completely across the path of movement of said peripheral armature portion and substantially axially through the part thereof presented to said pole pieces to thereby rotate said armature to said attracted position.

4. An electromagnetic operator comprising, a magnetically permeable frame having flat arcuate spaced generally parallel opposing pole faces defining an air gap therebetween, a magnetic armature mounted for rotation about an axis generally normal to said pole faces and having flat surfaces on axially opposite sides thereof substantially parallel with said pole faces, said armature being rotatable from a retracted position wherein only a portion of said opposite armature surfaces are presented to said pole faces to an attracted position in said air gap wherein said opposite armature surfaces are in registry with said opposing pole faces and said pole faces are spaced on axially opposite sides of said armature, and means for producing magnetic flux flow in said air gap from one of said opposing pole faces to the other completely across the path of movement of said armature and through said armature from one of said axially opposite surfaces to the other, whereby to rotate said armature to said attracted position.

5. An electromagnetic operator comprising, a magnetically permeable frame having spaced generally parallel opposing pole faces defining an air gap therebetween, a magnetic armature mounted for rotation about an axis disposed generally normal to said pole faces and having an inner supporting portion and a concentric peripheral arcuate arm portion having an axial thickness substantially greater than that of said inner portion, said pole faces also being arcuate in shape and concentric with said axis of rotation, said armature being rotatable from a retracted position wherein only a portion of said arcuate arm is presented to said pole faces to an attracted position wherein said arcuate arm is disposed in said air gap with said opposing pole faces in registry with said arcuate arm on axially opposite sides thereof, and means for producing magnetic flux flow from one of said opposing pole faces to the other completely across the path of movement of said armature arm and substantially axially through the part thereof presented to said pole faces to thereby rotate said armature to said attracted position.

6. An electromagnetic operator comprising, a magnetically permeable frame having spaced opposing pole pieces defining an air gap therebetween, a magnetic armature mounted for rotation about an axis disposed generally parallel with the direction of spacing of said pole pieces from a retracted position wherein only a portion thereof is presented to said pole pieces to an attracted position in said air gap wherein said opposing pole pieces are spaced on axially opposite sides of said armature, means biasing said armature to said retracted position, and means for producing magnetic flux flow in said air gap from one of said opposing pole pieces to the other completely across the path of movement of said armature and substantially axially through said armature portion presented to said pole pieces whereby to rotate said armature to said attracted position against said bias.

7. An electromagnetic operator comprising, a magnetically permeable frame having spaced opposing pole pieces defining an air gap therebetween, a magnetic armature supported for rotation about an axis disposed generally parallel with the direction of spacing of said pole pieces from a retracted position wherein only a portion thereof is presented to said pole pieces to an attracted position in said air gap wherein said opposing pole pieces are spaced on axially opposite sides of said armature, means for producing magnetic flux flow in said air gap from one of said opposing pole pieces to the other completely across the path of movement of said armature and substantially axially through said armature portion presented to said pole pieces whereby to rotate said armature to said attracted position, a member to be actuated, means affording support for said member independent of the support for said armature and biasing said member to a given position, and a force transmitting connection between said armature and member for moving said member away from said given position against its bias by rotation of said armature from retracted to attracted position.

8. An electromagnetic operator comprising, a magnetically permeable frame having two pairs of spaced opposing pole pieces defining a pair of air gaps therebetween, a magnetic armature mounted for rotation about an axis disposed generally parallel with the direction of spacing of said pole pieces, said armature having a pair of magnetic arms and being rotatable from a retracted position wherein only a portion of one of said arms is presented to one pair of said pole pieces and only a portion of the other of said arms is presented to the other pair of said pole pieces to an attracted position wherein each of said armature arms is positioned in one of said air gaps with an opposing pair of pole pieces spaced on axially opposite sides thereof, and means for producing magnetic flux flow in said air gaps from one pole piece of each pair to an opposing pole piece of each pair completely across the path of movement of said armature arms and substantially axially through the portions of said arms presented to said pole pieces, the forces drawing said armature arms into said pair of gaps being additive to thereby rotate said armature to said attracted position.

9. An electromagnetic operator comprising, a magnetically permeable frame having two pairs of spaced generally parallel flat arcuate opposing pole faces defining a pair of air gaps therebetween, a magnetic armature mounted for rotation about an axis disposed generally normal to said pole faces and having a pair of arcuate magnetic arms each having flat surfaces on axially opposite sides thereof substantially parallel with said pole faces, said armature being rotatable from a retracted position wherein only a portion of said opposite surfaces of one of said arms is presented to one pair of said pole faces and only a portion of said opposite surfaces of the other of said arms is presented to the other pair of said pole faces to an attracted position wherein each of said armature arms is positioned in one of said air gaps with the opposite surfaces of each arm in registry with the pole faces defining one of said air gaps and with said pole faces spaced on opposite sides thereof, and means for producing magnetic flux flow in said air gaps from one pole face of each pair to an opposing pole face of each pair completely across the path of movement of said armature arms and through said armature arms from one of said axially opposite surfaces thereof to the other, the forces drawing said armature arms into said pair of gaps being additive to thereby rotate said armature to said attracted position.

10. An electromagnetic operator comprising, a magnetically permeable shell having magnetic frame members at opposite ends thereof, a tubular flux generating coil disposed between said end members, said end members being formed with pole pieces projecting axially inwardly within said energizing coil and having axially spaced opposing pole faces defining an air gap therebetween radially inwardly of said coil, and a magnetic armature mounted for rotation coaxially within said coil from a retracted position wherein only a portion thereof is presented to said pole faces to an attracted position in said air gap wherein said armature is in registry with said pole faces, energization of said coil producing axial magnetic flux flow in said air gap from one of said opposing pole faces to the other completely across the path of movement of said armature and substantially axially through said armature portion presented to said pole pieces, whereby to rotate said armature to said attracted position.

11. An electromagnetic operator comprising a magnetic shell having magnetic frame members at opposite ends thereof, a tubular flux generating coil disposed within said shell between said frame members, pole pieces integral with said frame members extending axially into opposite ends of said tubular coil and affording pole faces presented inwardly in axially spaced opposing relation to provide an air gap therebetween radially inwardly of said coil, and a magnetic armature mounted for rotation coaxially within said coil, said armature comprising a radial web and peripheral axially extending armature arms affording said armature a generally H-shape in axial section through said arms, said armature arms having axially opposite surfaces presented to said pole faces.

References Cited in the file of this patent

UNITED STATES PATENTS

| | | |
|---|---|---|
| 1,784,517 | Farrand | Dec. 9, 1930 |
| 2,216,620 | List | Oct. 1, 1940 |
| 2,563,495 | Schleicher | Aug. 7, 1951 |
| 2,573,283 | Seitz | Oct. 30, 1951 |
| 2,668,251 | List | Feb. 2, 1954 |